3,071,721

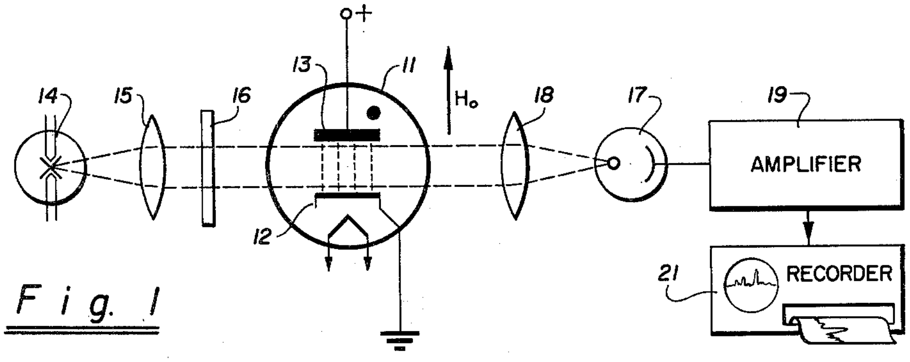
Fig. 1
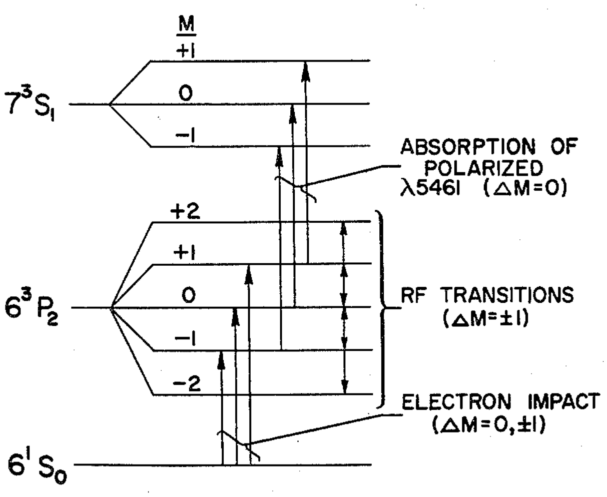
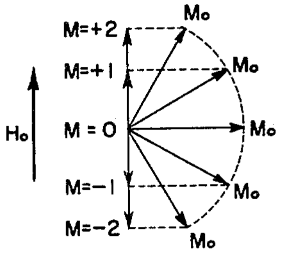
Fig. 3
Fig. 2
Fig. 5a
Fig. 5b
INVENTOR.
Hans G. Dehmelt
BY Paul B. Hunter
Attorney INVENTOR.
Hans G. Dehmelt
BY Paul B. Hunter
Attorney United States Patent Office
3,071,721
Patented Jan. 1, 1963

OPTICAL ABSORPTION MONITORING OF ORIENTED OR ALIGNED QUANTUM SYSTEMS

Hans George Dehmelt, Seattle, Wash., assignor to Varian Associates, Palo Alto, Calif., a corporation of California Filed Feb. 13, 1957, Ser. No. 640,020
33 Claims. (Cl. 324—.5)

Figure 4:
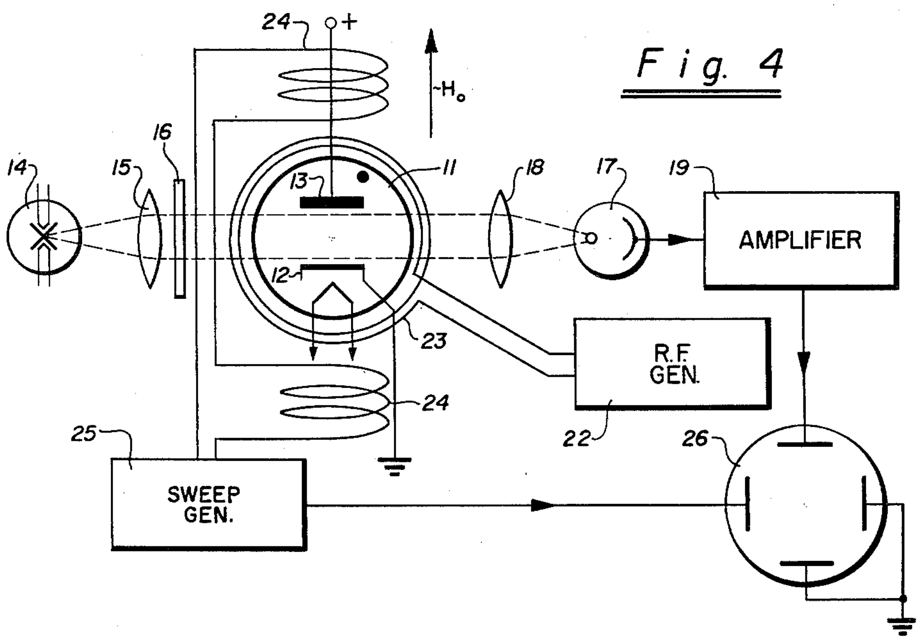

The present invention relates in general to physics phenomena and more particularly to novel methods and means for monitoring the orientation or alignment of atoms or analogous quantum systems by optical absorption techniques.

Since the present invention pertains to the complex field of atomic physics, it is felt that a brief outline of certain fundamental concepts in this particular field would be of decided benefit to those desiring to understand this invention. A more complete and detailed treatment of the subject can be found in the various texts on atomic theory; the following explanation merely states certain facts without adducing proof and also omits many features not of direct interest in explaining the present invention. This invention will be explained with reference to atoms but it should be understood that this invention is broadly applicable to analogous quantum systems in general when found under favorable conditions such as, for example, ions, nuclei and molecular quantum systems.

In accordance with well-known quantum theory as it is now understood, an atom is made up of a central nucleus having one or more electrons in elliptical orbits, i.e., energy levels or states, about the nucleus, the electrons revolving about the nucleus similar to the planets about the sun, certain of the orbits being circular while certain others are non-circular. An atom can exist only with its electrons in these definite discrete energy states or levels including the ground or normal state, which is the state of lowest energy, and higher energy (excited) states. An atom can jump to a higher energy state by absorbing a quantum of energy or it may jump to a lower energy state by radiating a quantum of energy, where the quantum of energy is equal to $h\nu$, where $h$ is Planck's constant and $\nu$ is the frequency of the radiation or absorption spectral line. In the case of two optical electron quantum systems, the optical energy level structure is attributable to two so-called optical electrons, which in the unexcited state are found as paired electrons in an outermost S shell.

Atoms may be excited to a higher energy state by the absorption of the necessary quantum of energy by several different methods, such as, for example, by bombarding them with electrons or by allowing them to absorb radiant energy from an external source. Conversely, an atom may fall to a lower energy state by the radiation of the necessary quantum of energy by different methods, such as, for example, by collision with another atom. The transitions between the energy levels take place, ordinarily, very rapidly and atoms remain in excited states for very short periods of time. It has been found, however, that there exist certain so-called metastable or long-lived energy states, excited states from which an atom may not return to lower levels by the emission of ordinary dipole radiation. The atoms therefore may remain in these metastable states for a comparatively long time being of the order of $10^{-2}$ seconds, for example, in the case of $^3P_2$ mercury atoms provided no other disturbances are present.

The nuclei and electrons of atoms possess certain properties of interest here, such as magnetic moments due to the nuclear spin angular momentum, the electron orbital angular momentum and the electron spin angular momentum. The magnetic moment of the atom is the vector sum of the magnetic moments of the nucleus and electrons of the atom. Thus the magnetic moment of the atom, in an external magnetic field $H_0$, may take up certain orientations relative to the direction of the magnetic field. Due to these properties of an atom and in accordance with the well-known Zeeman effect, the external magnetic field $H_0$ splits a particular energy level into a plurality of sublevels which are each separated slightly in the spectrum by an energy quantum $h\nu$. The magnetic moments of the atoms in the different sublevels are oriented in different directions relative to the direction of the magnetic filed $H_0$, these orientations of magnetic moments being identified by reference to their $z$ vector component, that is, the projection of the magnetic moment vector in the direction of the magnetic field $H_0$. To illustrate, in an energy state of total angular momentum $J=2$ split into five sublevels, there are five resultant $z$ component projections M of the atom magnetic moments. In the central energy state sublevel, the projection M is zero ($M=0$) which, of course, results from the fact that in this particular sublevel the magnetic moments are oriented in a plane normal to the direction of the magnetic field $H_0$. There are two components $M=+1$ and the larger component $M=+2$, in the direction of the magnetic field $H_0$ and two components, $M=-1$ and $M=-2$, anti-parallel to the direction of the magnetic field $H_0$.

Under suitable conditions, certain of which will be hereinafter described, certain of the sublevels may become predominantly populated relative to the other sublevels, that is overpopulated, and thus there are more magnetic moments of atoms oriented in one direction than in any of the other directions. That is, not all M states are equally populated. Such over-population is hereinafter referred to as alignment of the system.

The present invention has for its purpose the monitoring or investigation of the alignment of magnetic moments of atoms, or like quantum systems, in the magnetic field $H_0$ by optical absorption techniques. This is accomplished in one embodiment of this invention in the following manner. Quantum systems of a selected type, for example two optical electron quantum systems such as mercury (Hg) atoms, are raised from their ground energy state to a metastable energy state by the absorption of the necessary quantum of energy as, for example, by collisions with electrons, termed electron bombardment. Thus if a magnetic field $H_0$ is applied to the atoms parallel to an electron beam, the metastable energy state is split into a plurality of sublevels as mentioned above. In the case of the mercury atom example, there are five energy sublevels created with the five different atom orientations as explained. Alignment in metastable energy states is utilized for the purpose of explaining this invention since, as descrbed above, the atoms remain in such states for such relatively long times and thus preserve their alignment so that the alignment may be more easily monitored. In utilizing other atoms or quantum systems, of course, alignment in non-metastable energy states may be employed provided the energy state is sufficiently long-lived.

Optical radiation is now applied to the atoms in the metastable sublevels, this radiation having the spectral frequency necessary to supply the particular quantum of energy to the atoms to raise them from the metastable energy sublevels to a higher energy state from which the atoms may then return to the ground state in the normal course of events not of direct interest here. This higher energy state is also split into a plurality of magnetic sublevels due to the Zeeman effect, the number of sublevels being less than the number in the metastable state. Should this applied radiation be unpolarized, that is, not oriented in any particular direction relative to the magnetic field $H_0$, the atoms will be raised from the plurality of sublevels indiscriminately into the higher energy state sublevels. However, in this invention as utilized, the optical radiation is polarized by suitable means in a particular direction before transmission through the atoms in the metastable state, i.e., the electric and magnetic field vectors of the radiation are oriented in a particular selected direction relative to the direction of the magnetic field $H_0$ and thus relative to the alignment of the atoms. In such case, the quantum mechanics selection rules apply and atoms from certain ones of the metastable sublevels can only be raised to certain corresponding ones of the sublevels in the higher energy state. But since, as stated above, the higher energy state has less sublevels than the metastable state and therefore certain of the sublevels in the metastable state have no corresponding sublevels in the higher energy state, the atoms in these certain metastable state sublevels cannot be raised to the higher energy state by the polarized radiation. Thus atoms in certain sublevels absorb energy and move from their sublevels, while the atoms in certain other sublevels do not absorb energy, and thus remain in their sublevels. In the case of the mercury atom example, the metastable state as stated above has five sublevels $M=0, \pm 1$, and $\pm 2$. The higher energy state has three magnetic sublevels $M=0, \pm 1$. If the optical radiation is polarized in the direction of the magnetic field $H_0$, the selection rule $\Delta M=0$ governs, that is, atoms in the metastable state sublevels $M=0, \pm 1$ can be raised to the corresponding higher energy sublevels $M=0, \pm 1$, respectively, while atoms in sublevels $M=\pm 2$ have no corresponding sublevels in the higher energy state. Therefore, only the mercury atoms in the central metastable sublevels $M=0, \pm 1$, absorb radiation and are transmitted to the higher energy state sublevels $M=0, \pm 1$ while atoms in the sublevels $M=\pm 2$ do not absorb energy and remain in their respective sublevels. By detecting the optical radiation after it has passed through the atoms, for example, by means of a photocell which measures the intensity of the light, it is possible to accurately measure the amount of radiation absorbed by the atoms in the $M=0, \pm 1$, sublevels in transitions to the higher energy state.

Since the amount of radiation absorbed will be directly related to the proportion of the atoms in the absorbing sublevels ($M=0, \pm 1$ sublevels in the mercury illustration) as opposed to those atoms in the nonabsorbing sublevels, the measurement of the optical absorption by means for detecting the optical radiation after it has been transmitted through the atoms affords a very useful means for determining if, in fact, the alignment of the atoms in the sublevels has actually occurred and to what extent.

It is by no means necessary that the upper state have fewer M-levels than the lower one since the probabilities for the transitions are a function of the M value, for $\Delta M=0$ transitions generally decreasing with increasing $|M|$. For the discussed alignment monitoring scheme it is only necessary that the contribution to the absorption of the polarized radiation by the various M-states is unequal.

The above discussion may be expressed in concise mathematical form as follows:

$$K=\sum_m a_m P_m$$

where K is the absorption coefficient (percentage absorption of transmitted radiation due to the presence of the quantum system sample) actually measured, $a_m$ is the relative population of the $m$th sublevel $$\left(\sum_m a_m=1\right)$$

and $P_m$ is the $m$th sublevel absorption (probability that a system in the $m$th sublevel will absorb optical radiation). Thus if optical radiation is transmitted through the sample having such spectral characteristics that the sublevel absorptions, $P_m$, substantially differ as between one or more of the sublevels, the transmitted radiation serves to indicate and monitor the sublevel populations $a_m$. The extent to which a quantum system is aligned may be determined by the ratio $$\frac{K}{K_0}=\frac{\sum_m a_m P_m}{\sum_m P_m}$$

$K_0$ being the absorption coefficient with the unoriented (all $a_m$'s equal) but otherwise identical sample.

Referring to the illustrated example, $$\frac{K}{K_0}=\frac{\sum_{2J+1} a_M P_M}{\sum_{2J+1} P_M}$$

Here $a_M$ denotes the relative atom population in given magnetic substates and $P_M$ denotes the probability that state M undergoes a transition under the influence of the polarized radiation. The $P_M$ will of course depend on the type of polarization (linear, circular or unpolarized) of the light beam used, or in other words if $\Delta M=0$ or $\Delta M=\pm 1$ transitions are involved, and also on the orientation of the light beam with respect to the magnetic field.

In addition, this optical radiation monitoring scheme furnishes an extremely convenient technique for detecting gyromagnetic resonance of aligned quantum systems. For example, paramagnetic resonance techniques are now well-known in the art and, basically, involve transitions of atoms between Zeeman sublevels according to the selection rule $\Delta M=\pm 1$, the atoms being irradiated by an electromagnetic radiation at the particular Larmor frequency in the external magnetic field $H_0$. The transitions at resonance have been detected by electrically measuring the energy absorbed from the radio frequency radiation source by the atoms in transitions between sublevels. By utilization of the present invention, such paramagnetic resonance is detected by optically monitoring the alignment of the atoms in the Zeeman sublevels, an appreciable change in alignment of the atoms occurring at resonance since certain of the nonabsorbing Zeeman sublevels will be populated at the expense of certain of the absorbing sublevels resulting in a susbtantial weakening of the absorption of energy from the optical radiation.

Since, in accordance with known gyromagnetic resonance phenomena, the Larmor frequency is a direct function of the strength of the external magnetic field $H_0$, this invention provides a convenient system for accurately measuring magnetic field strengths by observing the value of the frequency of the applied radio frequency magnetic field necessary to produce the resonance optically detected as explained above. From this frequency value the strength of field $H_0$ may be easily determined.

It is also evident to those skilled in the art that this invention is also applicable to other facets of the gyromagnetic resonance art, such as, for example spectroscopy of unknown chemical samples.

It will be noted that this invention distinguishes from the detection of alignment of atoms by detecting the polarization of light scattered by the atom sample as proposed in the prior art. It should be understood that quantum systems may be aligned or oriented by various processes known in the art, including optical radiation (optical pumping) and low temperature techniques, and that the present invention broadly encompasses novel optical radiation techniques for monitoring any such alignment or orientation of quantum systems. How the alignment of the system is produced is immaterial so long as the system is susceptible to optical monitoring.

It is, therefore, the object of the present invention to provide a novel method and apparatus for monitoring the orientation or alignment of atoms or other analogous quantum systems by optical absorption techniques.

One feature of the present invention is the provision of a novel optical radiation and optical detecting system for monitoring the alignment of atoms or like quantum systems in fields preserving alignment such as magnetic fields.

Another feature of the present invention is the provision of a novel optical radiation and optical detecting system for utilization with gyromagnetic resonance techniques for optically detecting alignment of atoms or like quantum systems resulting from said gyromagnetic resonance.

Still another feature of the present invention is the provision of a novel gyromagnetic resonance device for utilization in measuring unknown magnetic fields or in chemical spectroscopy or the like.

Figure 6:
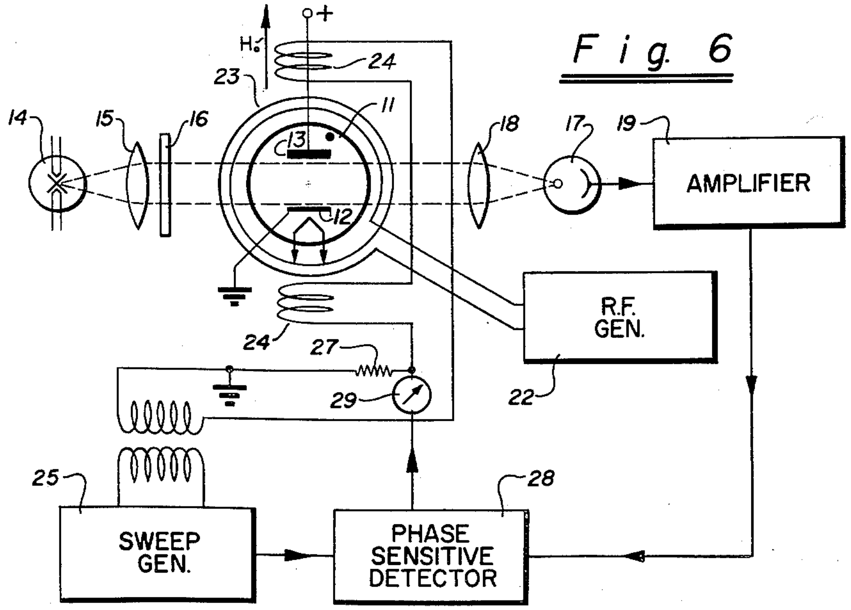

These and other features and advantages of the present invention will become apparent from a perusal of the following specification taken in connection with the accompany drawings wherein, FIG. 1 is a block diagram of one embodiment of the present invention for optically monitoring mercury atoms in Zeeman sublevels, FIG. 2 is a schematic diagram depicting the energy levels of the mercury atom of particular interest and the transitions therebetween, FIG. 3 is a schematic diagram showing the possible mercury atom magnetic moment orientations in a magnetic field $H_0$, FIG. 4 is a block diagram of a novel system utilizing the present invention for detecting paramagnetic resonance of mercury atoms by optical monitoring of the atom alignments, FIG. 5A is an oscilloscope trace of λ5461 absorption by $^3P_2$ mercury atoms versus field $H_0$ and shows the decrease in absorption by paramagnetic resonance realignment induced by a radio frequency field of ~62.5 milligauss. The radiation was polarized parallel to $H_0$;

FIG. 5B is an oscilloscope trace of λ5461 absorption by $^3P_2$ mercury atoms versus field $H_0$ and shows the increase in absorption by paramagnetic resonance realignment induced by a radio frequency field of ~62.5 milligauss. The radiation was polarized perpendicular to $H_0$; and FIG. 6 is a block diagram of one form of possible magnetometer device utilizing the present invention.

Referring now to FIG. 1 there is shown one embodiment of the present invention, utilizing a hot-cathode gas diode 11 containing mercury (Hg) vapor in equilibrium with liquid mercury at a pressure of the order of $1\times10^{-3}$ mm. of mercury. The gap between the cathode 12 and anode 13 is 2 cm., the cathode being operated at about 200 ma. and a plate voltage of about 20 volts favorable for the excitation of the $^3P_2$ energy state of the mercury atoms. Under these conditions, the gap is filled by an equipotential plasma and the cathode 12 closely surrounded by an ion sheath. The electrons emitted from the cathode receive all their acceleration inside this ion sheath and enter the plasma in a beam normal to the planar cathode 12 where the beam electrons collide with the mercury atoms.

In accordance with well-known quantum theory, the energy state of an atom is specified by a group of four quantum numbers. The lowest energy state or "ground state" for the two electrons outside the closed shell of 78 electrons in the mercury atom (Hg) is commonly defined as $6^1S_0$ where 6 is the principal quantum number, subscription 0 is the total angular momentum, S indicates zero orbital angular momentum and superscript 1 indicates the number of magnetic sublevels of this state, which, in this example, is one.

The atoms of mercury may be raised from the ground state $6^1S_0$ to higher energy level states (excited states) by bombarding them with electrons, as in FIG. 1, or by subjecting them to high temperatures or by allowing them to absorb radiant energy from an external source. The bombardment by the electron beam in the diode 11 under the conditions outlined above supplies energy to the mercury atoms sufficient to raise them from the $6^1S_0$ ground state to the $6^3P_2$ excited state. The $6^3P_2$ energy state is a metastable state from which an atom may not return to its ground state by the emission of radiation, all in accordance with the well-known "selection rules" of atomic physics, as may be done from many of the other excited states. Thus, the mercury atom, on reaching the $6^3P_2$ state, remains in this excited state unless it passes from the metastable state to the ground state by giving up the appropriate amount of energy to another atom during a collision or unless the atom absorbs radiation sufficient to raise it from the metastable state to a higher state, from which, selection rules permitting, it may return to the ground or normal state with the accompanying emission of radiation.

With the mercury atoms in the $6^3P_2$ energy level due to electron impact, consideration is now directed to the effect of a unidirectional magnetic field $H_0$ applied to the atoms parallel to the electron beam. In this particular embodiment the magnetic field strength is approximately 8.3 gauss and, in accordance with the known Zeeman effect, splits the $6^3P_2$ energy level into five sublevels, which, in the atomic spectrum, are each about 17.2 mc./sec. apart in the absence of nuclear moments (see FIG. 2). The magnetic moments $M_0$ of the atoms in the different sublevels are oriented in different directions relative to the direction of the level-splitting magnetic field $H_0$. Thus, the $z$ component of the magnetic moments, that is, the projection of the magnetic moment vector in theireciton of the magnetic field $H_0$, for the atoms in the $M=0$ sublevel is zero while the $z$ component for the magnetic moments of the atoms in the $M=\pm1$ and $M=\pm2$ sublevels are progressively larger, the magnetic moments in the $M=-1$ and $M=-2$ sublevels being equal but in the opposite directions or antiparallel to the magnetic moments in the $M=+1$ and $M=+2$ levels, respectively (see FIG. 3). Of these five sublevels, the $M=0$ and, because of electron spin exchange, the $M=\pm1$ sublevels are predominantly excited by the electron beam, i.e., predominantly populated by the mercury atoms as opposed to the $M=\pm2$ sublevels which constitutes an alignment of the system.

This alignment is now monitored by the optical transmission technique to see if, in fact, such alignment actually occurred and to what extent, in the following manner. In the present embodiment, radiation is supplied from a mercury-vapor lamp 14 of well-known type (standard mercury vapor rectifier with wide electrode spacing and open structure) which emits an optical radiation of 5461 Angstrom units (green light). This radiation is focused into a beam by means of a suitable lens 15, the beam being directed through the diode gap where the radiation may be absorbed by the mercury atoms to raise them from the $6^3P_2$ level to the $7^3S_1$ level. In the absence of any specific polarization of this λ5461 light, the atoms from the five sublevels $M=0, \pm1, \pm2$ would be raised, without discrimination between the sublevels, or at least with very little discrimination, into the three sublevels $M=0, \pm1$ of the higher energy level $7^3S_1$. From this higher level, the mercury atoms may return to the ground level or back to any of the five sublevels of the $6^3P_2$ state with the accompanying spectral radiation.

However, if the radiation from the mercury-vapor lamp 14 is polarized in a particular direction relative to the magnetic field $H_0$, the atoms in the five sublevels will not be indiscriminately raised to the higher energy state $7^3S_1$ but atoms from certain of the sublevels will absorb such polarized radiation and be raised while atoms in certain other sublevels will not absorb radiation and therefore will remain in their sublevel. For example, if a polarizing sheet 16 is positioned between the lens 15 and the diode 11 such that the mercury lamp radiation is polarized in a direction parallel to the magnetic field $H_0$, the quantum theory selection rule $\Delta M=0$ governs and, therefore, only the mercury atoms in the sublevels $M=0, \pm 1$, absorb the radiation and are promoted to the higher energy level $7^3S_1$ sublevels $M=0, \pm 1$, respectively. Thus, as depicted in FIG. 2, the atoms from the sublevels $M=0, \pm 1$, of energy level $6^3P_2$ populate the sublevels $M=0, \pm 1$, of energy level $7^3S_1$, respectively. Any atoms existing in the nonabsorbing sublevels $M=+2$ and $M=-2$ of level $6^3P_2$ do not move to the higher level $7^3S_1$ since there exists no corresponding sublevels $\pm 2$ in this higher state.

The amount of radiation absorbed by the mercury atoms may be determined by means of a photoelectric cell 17 positioned in the path of the radiation after it has passed from the diode, the D.C. output of the photocell 17 being a direct function of the $\lambda 5461$ radiation impinging thereon. A lens 18 may be utilized for focusing the light on the photocell. Thus increased radiation absorption in the diode 11 will result in a decrease in the D.C. output from the photocell 17 which may be viewed as an increased or decreased signal, by selection of suitable electrical amplification means 19, on a recorded device 21 or on an oscilloscope.

Since the amount of radiation absorbed will be directly related to the proportion of the mercury atoms in the absorbing $M=0, \pm 1$ sublevels of state $6^3P_2$ as opposed to those in the nonabsorbing $M=\pm 2$ sublevels, the measurement of such absorption affords very useful means for determining if, in fact, the alignment of the atoms in the $6^3P_2$ energy state has actually occurred and to what extent.

The majority of the mercury atoms which have been translated to the energy level $7^3S_1$, which is not a metastable state, may return, for example by the emission of radiation, to the ground state $6^1S_0$ from which they may return to the sublevels of the metastable energy state $6^3P_2$ by electron impact.

A substantial weakening of the $\lambda 5461$ radiation absorption may be accomplished by producing a paramagnetic resonance realignment of the mercury atoms in the energy state $6^3P_2$ so as to cause transitions between the Zeeman sublevels. Thus, by applying, by means of a suitable signal generator 22 and a radio frequency coil 23 adjacent the diode 11 (see FIG. 4), a radio frequency magnetic field $H_1$ perpendicular to the direction of the magnetic field $H_0$ and of the Larmor frequency (17.2 mc.) of the mercury atoms in the $H_0$ magnetic field of 8.3 gauss, a resonance of the mercury atoms occurs wherein $\Delta M=\pm 1$ transitions are induced between the magnetic sublevels. Since the electron impact did not appreciably populate the nonabsorbing $M=\pm 2$ sublevels, they will now be populated at the expense of the absorbing $M=0$, $\pm 1$ sublevels during the resonance transitions. This decreased population of the absorbing $M=0, \pm 1$ sublevels results in a substantial weakening of the $\lambda 5461$ absorption which is easily detected by the photocell 17. By modulation techniques common to those skilled in the art of gyromagnetic resonance, such as, for example, by modulating the magnetic field $H_0$ with an audio sweep magnetic field by use of suitable modulation coils 24 and associated sweep generator 25, the point of maximum paramagnetic resonance may be periodically swept through and viewed on an oscilloscope 26, the horizontal sweep plates of which are coupled to the audio generator 25. The decreased radiation absorption occurring during resonance is depicted in the oscilloscope trace in FIG. 5A. It is apparent that modulation of the frequency of the radio frequency field $H_1$ may be utilized to sweep through resonance rather than modulation of the magnetic field $H_0$. Thus, the paramagnetic resonance may be detected by the expedient of monitoring the alignment of the atoms by the observation of the absorption of polarized optical radiation.

If the nonabsorbing sublevels had been more heavily populated than the absorbing sublevels before resonance, then the radio frequency transitions would result in the absorbing sublevels gaining atoms at the expense of the nonabsorbing sublevels. This increased population of the absorbing sublevels results in an increase in the energy absorbed from the optical radiation and a decrease in the light detected by the photocell. No change in the light absorption would indicate equal population of the absorbing and nonabsorbing sublevels.

In accordance with known quantum theory, the spectral frequency of the energy quanta $h\nu$ separating the Zeeman magnetic sublevels is termed the Larmor frequency, this frequency being a direct function of the strength of the magnetic field $H_0$ producing the level splitting. Therefore, for a given atom, if the strength of the magnetic field $H_0$ is known, the Larmor frequency may be determined and vice versa. In the mercury atom example given, the Larmor frequency was 17.2 mc. in the 8.3 gauss magnetic field. The utilization of the present invention as a magnetometer device is immediately obvious. One practical magnetometer device is shown in FIG. 6. The above-described paramagnetic resonance apparatus including the optical radiation detecting apparatus is placed in an unknown magnetic field $H_0$ and the frequency of the applied radio frequency magnetic field from the generator 22 is adjusted until the maximum optical radiation transmission is detected by the photocell 17, indicating maximum paramagnetic resonance. From this Larmor frequency, the magnetic field strength may be easily determined. The sweep coils 24 are connected in circuit with a bias resistor 27. The output from the amplifier 19 is transmitted to a phase selective detector 28 to which a reference signal is also transmitted from the audio sweep circuit. The output of the phase selective detector is a D.C. voltage, the sign of which is dependent on whether the resonance is shifted off maximum resonance on the high or low side and the magnitude of which is dependent on the magnitude of the shift. This D.C. signal is transmitted to the bias resistor 27 to add the necessary bias to the magnetic field to automatically shift the resonance to its maximum value. The necessary D.C. bias current is indicated on a current meter 29 which is calibrated in magnetic field strengths. It is also possible to investigate various atoms spectroscopically by this paramagnetic resonance equipment having precisely determined magnetic fields $H_0$, radio frequencies and optical transmission frequencies.

The above example of mercury atoms and optical polarization parallel to the magnetic field $H_0$ was utilized to describe this invention. It will be immediately recognized by those skilled in this art that this invention is not limited to mercury atoms but applies to a large number of other atoms and to quantum systems in general. Also, the direction of polarization of the light may be selected in accordance with the quantum system and the results desired. For example, in the mercury atom illustration, if the optical radiation is polarized perpendicular to the $H_0$ field rather than parallel, the selection rule $\Delta M=\pm 1$ governs. In this case the $M=\pm 2$ sublevels turn out to be the more strongly absorbing ones and consequently when they are populated by R.F. resonance a strengthening of the absorption ensues (see FIG. 5B). The optical radiation may also be circularly polarized in which case the selection rules $\Delta M=+1$ or $\Delta M=-1$ apply, dependent on the direction of the circular polarization. If unpolarized light is used in the mercury experiment a weakening of the absorption is observed which corresponds to the difference in the signals (FIG. 5A, 5B) which result using light polarization parallel and perpendicular to the magnetic field.

As pointed out before, the absorption quotient K associated with the aligned system reflects the state of alignment. Anything changing the alignment like the discussed gyromagnetic resonance will therefore show up in the absorption coefficient. One other means of realignment of interest which should be mentioned here are radio frequency transitions between the sublevels of different hyperfine states, generally denoted by the quantum number F. For example the mercury isotope 199 has two hyperfine states $F=3/2,\ 5/2$. By using a microwave magnetic field of appropriate orientation, $\Delta M_F=0,\ \pm 1$, $\Delta F=\pm 1$ transitions may be induced whose realigning effect is similar to that of the $\Delta M=\pm 1$, $\Delta F=0$ radio frequency transitions discussed above. In accordance with well-known principles of quantum mechanics, $\Delta M=0$, $\Delta F=\pm 1$ hyperfine transitions may be independent of the external magnetic field and thus conveniently define a standard frequency.

It may be noted with reference to the described example that the electron bombardment means was so operated as to perform the dual functions of exciting the atoms into a metastable state and of aligning the atoms by predominately populating certain of the metastable sublevels. It is evident that some electron bombardment or other energy excitation means may be used to produce metastable states which will not at the same time produce appreciable alignment. In this latter case, an additional alignment process, such as the before-mentioned process of optical pumping, must be used. For example, the optical radiation source, itself, effects optical pumping since the absorption of optical radiation is accompanied by transitions out of only certain ones of the metastable sublevels to a higher energy level whereas the atoms may return from such higher level back to all of the metastable sublevels.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for monitoring the populations of sublevels of an optically absorbing state of quantum systems which comprises a sample of said quantum systems, means external to said sample for optically irradiating said quantum systems with an optical radiation directed through said sample, said radiation having a spectrum supplying quanta of energy to produce transitions from said optically absorbing state to optically excited states of said quantum systems, means inducing resonance transitions between said sublevels for selectively changing the population distribution of said sublevels, and means responsive to the non-absorbed optical radiation after it has passed through said quantum systems for detecting said population distribution changes.

2. Apparatus as claimed in claim 1 wherein said optical radiation is polarized.

3. Apparatus as claimed in claim 1 wherein said quantum systems are atoms and said sublevels are the magnetic sublevels of said atoms in a magnetic field.

4. Apparatus as claimed in claim 1 wherein said radiation responsive means produces an electrical signal as a function of the intensity of the radiation impinging thereon.

5. Apparatus for monitoring the optically absorbing state alignment of magnetic moments of quantum systems in magnetic fields which comprises means for aligning the magnetic moments of said quantum system in a magnetic field, separate means for irradiating said aligned quantum system with optical radiation directed through the quantum system having a spectral frequency supplying quanta of energy to produce transitions between quantum levels, and means for detecting the optical radiation, after it has passed through said aligned quantum system, which has not been absorbed by said quantum system during said transitions.

6. Apparatus as claimed in claim 5 wherein said optical radiation is polarized.

7. Apparatus as claimed in claim 5 wherein said quantum systems are atoms and said magnetic moments are the magnetic moments of said atoms.

8. Apparatus as claimed in claim 5 wherein said radiation responsive means produces an electrical signal as a function of the intensity of the radiation impinging thereon.

9. Apparatus as claimed in claim 7 wherein said means for aligning the magnetic moments comprises electron beam producing means for bombarding said atoms with the electrons from said beam.

10. Apparatus for monitoring the optically absorbing state alignment of magnetic moments of quantum systems in magnetic fields which comprises means for accommodating a sample of said quantum systems in a magnetic field, means external to said sample for irradiating said quantum systems with optical radiation directed therethrough, said radiation having a spectrum supplying quanta of energy to produce transitions from said optically absorbing state to optically excited states of said quantum systems, radiation responsive means for detecting said optical radiation after it has passed through said quantum system, and means for producing realignment of said magnetic moments by causing radio frequency transitions between sublevels in said magnetic field, said realignment of said moments being detected by said radiation responsive means as a change in the intensity of the optical radiation.

11. The combination as claimed in claim 10 wherein said realignment producing means includes means for applying an alternating magnetic field to said sample at a frequency effecting transitions governed by the selection rules $\Delta F=0$, $\Delta M_F=\pm 1$.

12. The combination as claimed in claim 10 wherein said realignment producing means includes means for applying an alternating magnetic field to said sample at a frequency effecting transitions governed by the selection rules $\Delta F=\pm 1$, $\Delta M_F=0,\ \pm 1$.

13. The combination as claimed in claim 10 wherein said optical radiation is polarized.

14. Apparatus for monitoring the optically absorbing state alignment of magnetic moments of quantum systems in a unidirectional magnetic field comprising means for optically irradiating said quantum systems with a polarized radiation having a spectral frequency supplying quanta of energy to produce transitions between quantum levels, optical radiation responsive means for detecting the optical radiation, after it has irradiated and passed through said quantum systems, which has not been absorbed by said quantum system during said transitions, and means for applying a radio frequency magnetic field to said quantum systems at their gyromagnteic resonance frequency in said magnetic field to thereby produce gyromagnetic resonance of said magnetic moments, said gyromagnetic resonance being detected by said optical radiation responsive means as a change in the optical radiation being transmitted to said radiation responsive means from said quantum systems.

15. The combination as claimed in claim 14 wherein said quantum systems are mercury atoms, including electron beam producing means for bombarding said mercury atoms with said electrons to produce alignment in said unidirectional magnetic field.

16. In combination, an electron discharge device having a cathode and anode and a mercury vapor in the gap between said cathode and anode, means for producing an electron beam across said gap for bombarding the mercury atoms, said cathode being placed in a unidirectional magnetic field with the field direction substantially parallel to said electron beam, said bombarding causing said atoms to be raised to a metastable energy state, means for producing a beam of optical radiation directed through said gap of angstrom units sufficient to raise said mercury atoms from said metastable state to a higher energy level, said optical radiation being polarized in the direction of said unidirectional magnetic field whereby said atoms are raised from energy absorbing levels and not from non-absorbing energy levels, and optical radiation responsive means positioned so as to intercept said beam of optical radiation after it has passed out from the gap, the light intensity of the optical radiation beam detected by said last means being a function of the number of said mercury atoms in the absorbing levels.

17. The method of monitoring the populations of magnetic sublevels of metastable states in two optical electron quantum systems which comprises the steps of placing said quantum systems in a metastable state, irradiating said quantum systems with optical radiation having such spectral characteristics as to effect differential sublevel absorption, aligning said quantum systems with respect to said magnetic sublevels, and detecting the nonabsorbed optical radiation after it has passed through said quantum systems as a measure of the net alignment of said sublevels.

18. The method of claim 17 wherein said step of aligning is effected by optical pumping.

19. The method of claim 17 further including the step of realigning said sublevels by causing radio frequency sublevel transitions.

20. Magnetometer apparatus comprising means for positioning an assemblage of quantum systems in a magnetic field in which said quantum systems may be aligned with respect to the magnetic sublevels of an optically absorbing state, optical radiation means for irradiating said quantum systems with optical radiation, the spectral characteristics of said optical radiation being such as to effect differential sublevel absorption, means for effecting realigning radio frequency transitions between said magnetic sublevels, means for detecting the intensity of nonabsorbed optical radiation after it has passed through said quantum systems, and means responsive to said detecting means for providing an output which varies in accordance with the strength of said field.

21. The magnetometer apparatus of claim 20 wherein said last-named means includes low frequency modulation means.

22. The apparatus of claim 20 wherein said quantum systems are two optical electron quantum systems and further including means for exciting said quantum systems to metastable states.

23. Apparatus for producing and maintaining resonance of quantum systems which comprises absorption vessel means containing said quantum systems in a gas or vapor form, means for optically irradiating said vessel with optical radiation having such spectral characteristics as to effect differential absorption among the sublevels of an optically absorbing energy state of said quantum systems whereby the populations of said sublevels are monitored by the intensity of the optical radiation passing through said vessel without absorption, means for applying a radio frequency magnetic field to said vessel at a frequency which effects resonance transitions between said sublevels, means for modulating said condition of resonance, means detecting the intensity of said nonabsorbed radiation after it has passed through said vessel for deriving a signal responsive to the modulation of said resonance, and means responsive to said last-named signal for maintaining said condition of resonance.

24. The apparatus of claim 23 wherein said resonance maintaining means includes a phase sensitive detector responsive to said modulation means and said optical intensity detection means.

25. The method for monitoring alignment due to population distributions in atomic sublevels of an optically absorbing state of quantum systems which comprises the steps of irradiating said quantum systems with optical radiation directed through said quantum systems, said radiation having an spectrum supplying quanta of energy to produce transitions from said optically absorbing state to optically excited states of said quantum systems, detecting the non-absorbed optical radiation after it has passed through said quantum systems, selectively changing the population distribution of said sublevels, and detecting changes in the intensity of said detected radiation which result from the changing of said population distribution.

26. The method of claim 25 wherein said irradiating optical radiation has such spectral characteristics as to be differentially absorbed by said sublevels.

27. The method of claim 26 including the step of polarizing said optical radiation before it irradiates said quantum systems.

28. The method of claim 25 wherein said quantum systems are atoms and said sublevels are the magnetic sublevels of said atoms in a magnetic field.

29. The method of claim 25 wherein said population distribution is changed by inducing resonance transitions between said sublevels.

30. The method of claim 29 wherein said sublevels are magnetic sublevels in an alignment-preserving magnetic field and said population distribution is changed by inducing realigning radio frequency transitions between said sublevels governed by the selection rules $\Delta F=0$, $\Delta M_F=\pm 1$.

31. The method of claim 29 wherein said sublevels are magnetic sublevels in an alignment-preserving magnetic field and said population distribution is changed by inducing realigning radio frequency transitions between said sublevels governed by the selection rules $$\Delta F=\pm 1,\ \Delta M_F=0,\ \pm 1$$

32. The method of claim 25 including the step of aligning said quantum systems in an alignment-preserving field, said population distribution change being effected by producing realignment of said quantum systems.

33. The method of claim 25 wherein said changes are detected by producing an electrical signal which varies in accordance with the intensity of the detected radiation.

References Cited in the file of this patent

UNITED STATES PATENTS

| | | |
|---|---|---|
| 2,383,075 | Pineo | Aug. 21, 1945 |
| 2,617,940 | Giguere | Nov. 11, 1952 |
| 2,670,649 | Robinson | Mar. 2, 1954 |
| 2,690,093 | Daly | Sept. 28, 1954 |

OTHER REFERENCES

Sagalyn: Physical Review, vol. 94, No. 4, May 15, 1954, pp. 885 to 892.

Brossel et al.: Physical Review, vol. 86, No. 3, May 1, 1952, pp. 308 to 316.

Kastler: Le Journal Der Physique et le Radium, vol. 11, June 1950, pp. 255 to 263.

Sears et al., University Physics, 2nd Ed., Addison Wesley Publishing Co. Inc., Cambridge 42, Mass., 1955, pp. 895–897.

Pound et al.: Physical Review, vol. 21, No. 3, March 1950, pp. 219–225.

Ebbinghaus: Annalen Der Physik, vol. 7, 1930, pages 267–275 relied upon.

Seiwert: Annalen Der Physik, vol. 18, No. 453, May 15, 1956, pages 54, 58, 59, 62, 71, and 78 relied upon.